Patented Aug. 12, 1952

2,606,814

UNITED STATES PATENT OFFICE 2,606,814

PRODUCTION OF ALUMINUM

Elias S. Murphy and Sherman A. Davidson, Ogden, Utah

No Drawing. Application November 15, 1948, Serial No. 60,180

11 Claims. (Cl. 23—143)

The invention relates to a process for treating clay for the recovery of valuable products therefrom, and more particularly to the preparation and recovery of silicon dioxide and aluminum oxide, which latter oxide may then be subjected to the customary electrolytic decomposition process for the production of the metal aluminum.

Clay is a product of the slow decomposition of feldspar and of other minerals forming the earth's crust and like all such products is of great stability. It is not usable directly as a raw material for either electrolytic or chemical processes resulting in the production of metallic aluminum. The metallic aluminum must be produced by a known process, preferably electrolytic, from aluminum oxide (alumina) or chloride and in order to use clay as a raw material one of such compounds capable of being subjected to the electrolytic process must first be produced.

Prior attempts in this field have been principally directed towards the production of an aluminum chloride rather than towards the production of an oxide of aluminum. However, they have met with little success and such processes have not gone into commercial use.

The present invention has accordingly as one of its principal objects the development of a commercial process in which silicon dioxide and aluminum oxide are produced from clay, which latter oxide may then undergo the well known electrolytic treatment. According to the invention finely divided clay in aqueous suspension is treated with carbon dioxide and sodium chloride, which treatment may be accompanied by the application of heat and/or superatmospheric pressure. The ions produced by the dissociation of the sodium chloride and by the solution of the carbon dioxide in water appear to interact with the finely divided molecules of the clay in the water suspension and result in the efficient solution of alumina from the clay suspension, leaving silicon dioxide ($SiO_2$) in a form which may be readily separated out by filtering or decanting. The silicon dioxide is filtered out and ammonia is then added to the filtrate which results in the precipitation of aluminum oxide and of sodium bicarbonate, ammonium chloride remaining in solution. Separation of the aluminum oxide from the sodium bicarbonate takes place by treatment with hot water and filtering. The aluminum oxide alone is precipitated while the $NaHCO_3$ goes into solution and remains in the filtrate. The further treatment of the aluminum oxide by an electrolytic process in order to obtain metallic aluminum is well known and need not be described.

The above described treatment with carbon dioxide and sodium chloride proceeds according to the following ionic equation:

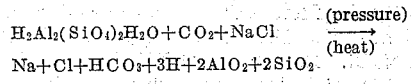

$$H_2Al_2(SiO_4)_2H_2O + CO_2 + NaCl \xrightarrow[\text{(heat)}]{\text{(pressure)}}$$
$$Na + Cl + HCO_3 + 3H + 2AlO_2 + 2SiO_2$$

After the filtering out of the $SiO_2$ (or the decanting of the solution) ammonia is added to the filtrate, the result being the formation of $Al_2O_3$ and $NaHCO_3$ according to the following ionic equation:

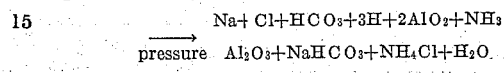

$$Na + Cl + HCO_3 + 3H + 2AlO_2 + NH_3 \xrightarrow{\text{pressure}} Al_2O_3 + NaHCO_3 + NH_4Cl + H_2O$$

The addition of ammonia may be made while the filtrate is under pressure.

The present process is a wet process in which the clay and the two reagents, sodium chloride (NaCl) and carbon dioxide ($CO_2$), are brought into solution or suspension before any of the reaction can proceed to completion. Thus the process is to be distinguished from processes in which clay in dry powdered form is subjected to a mixture of gases such as $H_2O$, $CO_2$, CO, $SO_3$, $SO_2$, etc. According to the present process the only gas employed is $CO_2$ which is bubbled through a clay in water suspension preferably containing sodium chloride (NaCl).

Application of pressure and/or heat, while not essential in all cases, is desirable and tends to accelerate the reaction and to improve the activity and the yield.

The following specific examples are given by way of illustration rather than by way of limitation:

Example 1

In a given instance the process was carried out in separate stages using two appropriate flasks, one of a capacity of about 2 liters and the other of a capacity of 5 liters. The first flask was tightly closed but was connected by a pipe with the second flask, the pipe leading close to the bottom of the larger flask. The latter flask was in communication with the open air by means of a short pipe.

Into the larger flask 258 grams of finely divided clay ($H_2Al_2(SiO_4)_2H_2O$), 58.5 grams of sodium chloride and 2.5 liters of distilled water were placed. The ingredients were stirred until uniform mixture had taken place, thus forming a clay in water suspension or solution containing sodium chloride. Into the smaller flask 2 lbs. of Dry Ice ($CO_2$) were placed. The process was carried out at room temperature and under normal atmospheric pressure. The carbon dioxide was bubbled through the mixture in the larger flask for seven hours. The mixture was then allowed to settle and the natant liquid was separated by filtering or decanting from the precipitated $SiO_2$.

To the filtrate (solution #1) 30 ccm. of $NH_4OH$ of 0.90 density was added which contained 28% of $NH_3$ by weight, thereby causing a precipitation of aluminum oxide or hydroxide and sodium bicarbonate. The addition was made very slowly, to avoid a sudden change of the pH which might entail redissolving of $Al(OH)_3$.

The resultiing solution (solution #2) was filtered and the precipitate was washed with hot water to precipitate the alumina alone and again filtered to remove the sodium bicarbonate which goes into solution and remains in the filtrate. It was then dried and weighed. 5.04 grams of aluminum oxide ($Al_2O_3$) were obtained in this way.

The last filtrate from which the alumina had been removed was evaporated and 3.98 grams of $NaHCO_3$ were obtained.

Finally the filtrate from solution #2 was evaporated and the $NH_4Cl$ was separated from the excess $NaCl$. 18.3 grams of $NH_4Cl$ were obtained.

The following table will give a picture of the yield of the process.

| Substance | Actual weight | Theoretical weight |
| --- | --- | --- |
| $H_2Al_2(SiO_4)_2H_2O$ | 258 | 258 |
| NaCl | 58.5 | 58.5 |
| $CO_2$ | (¹) | 44 |
| $NH_3$ | 7.56 | 17 |
| Result: | | |
| $Al_2O_3$ | 5.04 | 102 |
| $NH_4Cl$ | 18.3 | 53.5 |
| $NaHCO_3$ | 3.98 | 83 |

¹ Not known.

Expressed in percentages $$Al_2O_3 = \frac{5.04}{102} \text{ equals } 4.9\%$$

$$NaHCO_3 = \frac{3.98}{83} \text{ equals } 4.7\%$$

$$NH_4Cl = \frac{18.3}{53.5} \text{ equals } 34.2\%$$

*Example 2*

The process was carried out in a steel tank provided with a cap forming a pressure seal in order to apply superatmospheric pressure and temperature. The steel tank had a capacity of around 6 liters and was equipped with a pressure gauge with a safety valve and with a thermometer. The materials as stated below were placed into the tank, the Dry Ice being added to the other materials. The Dry Ice when melting produced a pressure of 550 lbs. per sq. inch at the start which afterwards in the course of the process decreased to 500 lbs. per sq. inch. The temperature was maintained at about 80° F. or slightly above room temperature. The process was completed in nineteen hours and the materials were kept in a state of agitation by imparting movement to the tank at frequent intervals.

After completion of the above treatment the process was carried out in all other respects exactly as previously described, starting with settling of the mixture, filtering off of $SiO_2$, addition of ammonia, etc.

The following quantitative and qualitative results were obtained:

| Substance | Actual Weight | Theoretical Weight |
| --- | --- | --- |
| $H_2Al_2(SiO_4)_2H_2O$ | 508 | 508 |
| NaCl | 117 | 117 |
| $CO_2$ | (¹) | 88 |
| $NH_3$ | 15 | 34 |
| $Al_2O_3$ | 34.2 | 204 |
| $NH_4Cl$ | 40 | 107 |
| $NaHCO_3$ | 30.24 | 168 |

¹ Not measured.

Percentages $$Al_2O_3 \quad \frac{34.2}{204} \quad 16.8\%$$

$$NH_4Cl \quad \frac{40}{107} \quad 37.4\%$$

$$NaHCO_3 \quad \frac{30.24}{168} \quad 18.0\%$$

It is seen from this example that the application of heat and superatmospheric pressure produces an increased activity and therefore a marked increase of the yield. While an increase of temperature and/or pressure results in increased activity and in increased yield, temperatures sufficient to vaporize the water at the pressure employed should be avoided as the process is essentially a wet process as distinguished from a dry or vapor process.

In view of the fact that the raw material is procurable in unlimited quantity at low price the yield obtained is sufficiently high to secure great advantages over the production of aluminum by means of ores consisting of or rich in aluminum oxide.

Where aluminum oxide for the preparation of metallic aluminum is the product sought substantially pure clay or kaolin must be employed as a raw or starting material. Where, however, pure $SiO_2$ is the product principally sought either pure or impure clay may be employed as the raw material.

The invention has been described in detail for the purpose of illustration but it will be obvious that numerous modifications and variations may be resorted to without departing from the spirit of the invention as will be apparent to those skilled in the art.

Having described the invention, what is claimed as new is:

1. A wet process for producing aluminum oxide from clay which consists in treating clay in water suspension with carbon dioxide and sodium chloride, filtering out the $SiO_2$ from the suspension, then adding $NH_3$ to the filtrate, thus obtaining a precipitate containing $Al_2O_3$.

2. A process as claimed in claim 1 in which the treatment of clay with carbon dioxide and sodium chloride is carried out under application of superatmospheric pressure.

3. A wet process for producing aluminum oxide from clay which consists in treating clay in water suspension and at substantially room temperature with carbon dioxide and sodium chloride, filtering out $SiO_2$ from the suspension, adding $NH_3$ to the filtrate, thus obtaining a precipitate, treating the precipitate with hot water and filtering, thus obtaining $Al_2O_3$ as the sole precipitate.

4. A wet process for producing aluminum oxide from clay which consists in bubbling carbon dioxide through a uniform mixture containing finely divided clay, sodium chloride and water, filtering the liquid after the mixture was allowed to settle, adding $NH_4OH$ slowly to the filtrate, filtrate, filtering the solution thus obtained, removing the precipitate and washing it with hot water, and again filtering and drying the precipitate to produce $Al_2O_3$.

5. A wet process of treating clay which comprises forming a suspension of finely divided clay in water containing sodium chloride, then passing $CO_2$ through the suspension at substantially room temperature until the alumina is dissolved, then separating out $SiO_2$ from the suspension.

6. A wet process of treating clay which comprises forming a suspension of finely divided clay in water containing sodium chloride, then passing $CO_2$ through the suspension at substantially room temperature until the alumina is dissolved, then filtering out $SiO_2$ from the suspension and treating the filtrate with ammonia whereby aluminum oxide ($Al_2O_3$) is precipitated, and separating out the aluminum oxide.

7. A wet process of treating clay which comprises forming an aqueous suspension of finely divided clay in water containing sodium chloride, then passing $CO_2$ through the suspension until $SiO_2$ separates out, removing the $SiO_2$ from the suspension, then treating the filtrate with ammonia whereby a precipitate including aluminum oxide is formed, and separating out the aluminum oxide.

8. A process as set forth in claim 7 wherein the treatment of the clay with carbon dioxide and sodium chloride is carried out under superatmospheric pressure.

9. A process as set forth in claim 7 wherein the treatment of the clay with sodium chloride and carbon dioxide is carried out at a temperature above room temperature, but below that required to vaporize the water under the pressure conditions employed in the process.

10. A process as set forth in claim 7 wherein impure clay is initially treated and substantially pure $SiO_2$ is recovered as the first precipitate.

11. A wet process of treating clay which comprises forming an aqueous suspension of finely divided clay, treating the suspension with sodium chloride and carbon dioxide until silicon dioxide alone is precipitated, removing silicon dioxide, then treating the filtrate with ammonia whereby a precipitate including aluminum oxide is formed, separating out the precipitate, washing the precipitate with hot water to precipitate the aluminum oxide alone, and separating out the aluminum oxide.

ELIAS S. MURPHY.
SHERMAN A. DAVIDSON.

REFERENCES CITED

The following references are of record in the file of this patent:

UNITED STATES PATENTS

| Number | Name | Date |
|---|---|---|
| 691,470 | Jordan | Jan. 21, 1902 |
| 941,799 | McCulloch | Nov. 30, 1909 |
| 1,111,881 | Cowles | Sept. 29, 1914 |
| 1,337,192 | Buchner | Apr. 20, 1920 |
| 1,497,263 | Frink | June 10, 1924 |
| 1,938,173 | Crawford | Dec. 5, 1933 |
| 1,950,883 | Gitzen | Mar. 13, 1934 |
| 1,971,319 | Wildman | Aug. 21, 1934 |
| 2,181,669 | Scholder | Nov. 28, 1939 |

FOREIGN PATENTS

| Number | Country | Date |
|---|---|---|
| 368,106 | France | Sept. 26, 1906 |
| 134,531 | Great Britain | July 8, 1928 |
| 16,597 | Great Britain | Apr. 7, 1921 |

OTHER REFERENCES

Edwards et al., "The Aluminum Industry," vol. 1, pages 162 and 211, (1930) McGraw-Hill Book Co., New York.